United States Patent
Wels et al.

(10) Patent No.: US 12,151,232 B2
(45) Date of Patent: Nov. 26, 2024

(54) CATALYST AND ITS USE IN FATTY ACID ISOMERISATION

(71) Applicant: EQUUS UK TOPCO LTD, East Yorkshire (GB)

(72) Inventors: Bastiaan Wels, East Yorkshire (GB); Sophie Claude Catherine Wiedemann, East Yorkshire (GB); Tanja Van Bergen-Brenkman, East Yorkshire (GB); Remco Benjamin Van Triet, East Yorkshire (GB)

(73) Assignee: CARGILL BIOINDUSTRIAL UK LIMITED (GB)

( * ) Notice: Subject to any disclaimer, the term of this patent is extended or adjusted under 35 U.S.C. 154(b) by 439 days.

(21) Appl. No.: 17/250,841

(22) PCT Filed: Sep. 23, 2019

(86) PCT No.: PCT/EP2019/075475
§ 371 (c)(1),
(2) Date: Mar. 11, 2021

(87) PCT Pub. No.: WO2020/064601
PCT Pub. Date: Apr. 2, 2020

(65) Prior Publication Data
US 2022/0032274 A1 Feb. 3, 2022

(30) Foreign Application Priority Data
Sep. 25, 2018 (GB) ..................................... 1815581

(51) Int. Cl.
*B01J 29/40* (2006.01)
*B01J 35/61* (2024.01)
*B01J 35/63* (2024.01)
*C10G 3/00* (2006.01)

(52) U.S. Cl.
CPC .............. *B01J 29/40* (2013.01); *B01J 35/613* (2024.01); *B01J 35/635* (2024.01); *B01J 35/638* (2024.01); *C10G 3/44* (2013.01); *B01J 2229/14* (2013.01); *B01J 2229/37* (2013.01); *B01J 2229/38* (2013.01); *B01J 2229/40* (2013.01)

(58) Field of Classification Search
CPC ........ B01J 29/40; B01J 35/613; B01J 35/635; B01J 35/638; B01J 2229/14; B01J 2229/37; B01J 2229/38; B01J 2229/40; B01J 35/615; B01J 35/617; B01J 35/633; B01J 35/647; B01J 2229/16; C10G 3/44; Y02P 30/20
See application file for complete search history.

(56) References Cited

U.S. PATENT DOCUMENTS

| | | |
|---|---|---|
| 3,702,886 A | 11/1972 | Argauer et al. |
| 2003/0191330 A1 | 10/2003 | Zhang |
| 2003/0191331 A1 | 10/2003 | Shuguang |
| 2008/0045731 A1 | 2/2008 | Zhang |
| 2013/0184147 A1 | 7/2013 | Ryoo |
| 2013/0245299 A1 | 9/2013 | Geboers et al. |
| 2014/0249344 A1 | 9/2014 | Minoux |
| 2016/0184809 A1 | 6/2016 | Lagauche |
| 2018/0169636 A1 | 6/2018 | Nubel |
| 2018/0185827 A1 | 7/2018 | Cheng et al. |

FOREIGN PATENT DOCUMENTS

| | | | |
|---|---|---|---|
| CN | 102910644 A | 2/2013 | |
| CN | 102874829 B | 7/2014 | |
| CN | 104030314 A | 9/2014 | |
| CN | 105271299 A | 7/2017 | |
| EP | 1490171 A2 | 7/1985 | |
| EP | 0683150 A1 | 11/1995 | |
| JP | 2016525447 A | 8/2016 | |
| JP | 2016527076 A | 9/2016 | |
| RU | 2393992 C1 | 7/2010 | |
| WO | WO-03082464 A1 * | 10/2003 | ............ B01J 29/041 |
| WO | 2011136903 A1 | 11/2011 | |
| WO | 2014064418 A2 | 5/2014 | |
| WO | 201501004 A1 | 1/2015 | |
| WO | 2015144232 A1 | 10/2015 | |
| WO | 2016145619 A1 | 9/2016 | |
| WO | 2017005719 A1 | 1/2017 | |

OTHER PUBLICATIONS

Erigoni, et al: Creating Accessible Active Sites in Hierarchical MFI Zeolites for Low-Temperature Acid Catalysis, ChemCatChem, 2016, 1-10.
Sarker, et al: Research Article, Convenient and Environmentally Friendly Production of Isostearic Acid with Protonic Forms of Ammonium Cationic Zeolites, European Journal of Lipid Science and Technology, 2017, 26 pages.
Masudi, et al: Vegetable Oil to Biolubricants: Review on Advanced Porous Catalysts, ACS Publications, Energy Fuels, 2018, pp. A-P.
International Search Report and Written Opinion for PCT Application No. PCT/EP2019/075475, mailed Dec. 11, 4 2019; 11 pages.
Catalysis Today, 2016, vol. 269, p. 175-181, DOI: 10.1016/j.cattod.2015.10.032.

* cited by examiner

*Primary Examiner* — Deborah D Carr

(57) ABSTRACT

The present invention relates to an isomerisation catalyst, in particular a zeolite catalyst. There is provided a method for making a particularly preferred zeolite catalyst by means of modifying catalytic zeolite materials. There is also provided a 5 process for isomerising fatty acids or alkyl esters thereof to produce branched fatty acids employing such an isomerisation catalyst, a composition comprising branched fatty acids, and also use of the isomerisation catalyst.

19 Claims, No Drawings

CATALYST AND ITS USE IN FATTY ACID ISOMERISATION

CROSS-REFERENCE TO RELATED APPLICATIONS

This application is the National Stage of International Patent Application No. PCT/EP2019/075475 (filed Sep. 23, 2019), "A Catalyst And Its Use In Fatty Acid Isomerisation," which application claims priority to Great Britain Patent Application No. 1815581.2, "A Zeolite and its Use in Fatty Acid Isomerization" (filed Sep. 25, 2018), the disclosures of which applications are incorporated herein by reference in their entireties for any and all purposes.

FIELD OF THE INVENTION

The present invention relates to a catalyst, in particular a zeolite catalyst, suitable for use as an isomerisation catalyst, a method for making the zeolite catalyst, a process for isomerising fatty acids or alkyl esters thereof to produce branched fatty acids employing a catalyst, a composition comprising branched fatty acids, and also use of the catalyst.

BACKGROUND

Fatty acids are versatile building blocks used in many parts of the chemical industry, in applications ranging from lubricants, polymers, and solvents to cosmetics and health care. Fatty acids are generally obtained by the hydrolysis of triglycerides of vegetable or animal origin. Naturally occurring triglycerides are esters of glycerol and generally straight chain, even numbered carboxylic acids ranging from 10 to 24 carbon atoms. Most common are fatty acids having 12, 14, 16 or 18 carbon atoms. Such fatty acids may be saturated or unsaturated i.e. contain one or more unsaturated carbon double bonds.

Straight chain saturated fatty acids having 10 or more carbon atoms are solid at room temperature, which makes them difficult to process in a number of applications. Unsaturated long chain fatty acids, e.g. oleic acid, are liquid at room temperature, and so are easy to process, but are unstable because of the existence of one or more carbon double bonds. Branched saturated fatty acids can mimic the properties of the straight chain unsaturated fatty acids in many respects. In addition, they are generally more oxidatively stable than unsaturated fatty acids. Thus, branched fatty acids are, for many applications, more desirable than straight chain fatty acids. The branched fatty acids have one or more alkyl side groups which are generally short, e.g. methyl, ethyl or propyl, and can be attached to the carbon chain backbone at any position.

Commercially available branched fatty acids such as isostearic acid, are obtained as a by-product of the catalytic or thermal dimerisation of unsaturated straight chain fatty acids. Isostearic acid is typically produced by heating oleic acid in the presence of suitable catalyst, generally a Montmorillonite clay, to produce dimer, trimer and higher oligomer acids. But instead of polymerising, a portion of the oleic acid rearranges to give a branched, monomeric fatty acid which can be isolated by distillation and hydrogenated. This saturated branched monomeric fatty acid is a mixture of various linear and mainly branched, both monobranched and polybranched, saturated acids which is known as isostearic acid.

Isostearic acid exhibits better stability to oxidation than oleic acid and is a very useful product which is sold into a wide range of application areas such as lubricant esters, and cosmetic applications. Isostearic acid is also used to make isostearyl alcohol.

EP0683150 of Kao Corporation discloses a process for producing branched fatty acids by using zeolite catalysts which have a linear microporous structure and a mean pore size of under 1 nm. These catalysts are highly diffusion limited because they have only a microporous crystalline structure, and as a result requires a high loading of catalyst (e.g. 4 to 8 wt % on the basis of the weight of the fatty acid starting material in the Examples) in order to achieve a sufficient conversion.

EP1490171 of Akzo Nobel discloses a fatty acid isomerisation process using acidic mesoporous aluminosilicate materials, referred to as MAS-5. The MAS-5 has a sharp pore size distribution at 3.7 nm (37 Å) as given in Table 1 of the disclosure, indicating it is mesoporous. The solely mesoporous nature of the material causes poor catalytic performance, as shown by the need to use a very high loading of catalyst (e.g. 10 wt % in Example 1) in order to achieve a sufficient conversion.

WO2011/136903 discloses a process for producing branched fatty acids by using a combination of a ferrierite zeolite catalyst and a sterically hindered Lewis base. The catalyst in this example has only a microporous crystalline structure, and as a result is diffusion limited and requires a high loading of catalyst in order to achieve sufficient conversion. Additionally, the ferrierite structure of the catalyst leads to a substantially more linear product (i.e. the mixed product obtained contains a higher content of linear groups versus branched groups). This results in different properties of the resulting isomerised fatty acids as compared to alternative process routes, meaning the products of this process are not suitable for many of the existing applications of isostearic acids.

Therefore, there remains a need for an improved process for producing branched fatty acids by isomerisation, and a need for an improved isomerisation catalyst for use in such a process.

SUMMARY OF THE INVENTION

The present invention is based in part on the recognition by the inventors that a process of isomerising fatty acids or alkyl esters thereof to produce branched fatty acids may be improved by using an improved catalyst comprising micropores and mesopores and wherein the micropore volume ($v_{micro}$) is from 1% to 50% of the total volume ($v_{pore}$) of micropores and mesopores. Preferably the catalyst is a zeolite or zeotype catalyst. The catalyst must necessarily be active for isomerisation of fatty acid or alkyl esters of fatty acid and can be conveniently referred to as an isomerisation catalyst.

Use of this catalyst may provide an improvement in the production of branched fatty acids.

Thus, the present invention provides a catalyst, wherein the catalyst comprises micropores and mesopores and wherein the micropore volume ($v_{micro}$) is from 1% to 50% of the total pore volume ($v_{pore}$) of micropores and mesopores.

Additionally, or alternatively, the present invention provides a catalyst, wherein the catalyst has an activity factor of at least 30,000, wherein the activity factor is calculated as shown in formula (I):

$$\text{activity factor} = S_{external} \times \text{strong NH}_3 \text{ uptake} \quad \text{(I)}$$

wherein:

"$S_{external}$" is the external surface area in m²/g of the catalyst, measured by nitrogen physisorption; and "strong NH₃ uptake" is the amount of $NH_3$ in μmol/g which desorbs from the catalyst at a temperature between 327° C. and 550° C. during ammonia temperature programmed desorption, measured as defined in the test methods herein.

The present invention provides a method of making a suitable zeolite catalyst by modifying the structure of a zeolite comprising the steps of:
 i) contacting the zeolite with an alkaline solution, preferably comprising NaOH;
 ii) contacting the zeolite with an acidic solution, preferably comprising HCl; and
 iii) contacting the zeolite with an ion exchange material, preferably an exchange solution, and preferably an exchange solution comprising $NH_4NO_3$.

The present invention also provides a process for producing branched fatty acids from a starting material (or feedstock) which comprises unsaturated fatty acids, wherein the process comprises the steps of:
 i) contacting a starting material comprising unsaturated fatty acids with a catalyst; and
 ii) using the catalyst to isomerise an amount of the unsaturated fatty acids to form a composition comprising branched fatty acids;
 wherein the catalyst comprises micropores and mesopores and wherein the micropore volume ($V_{micro}$) is from 1% to 50% of the total volume ($V_{pore}$) of micropores and mesopores.

The present invention further provides a composition comprising branched fatty acids which is obtainable by, preferably obtained by, a process as described herein. Suitably, the present invention provides a composition comprising branched fatty acids.

The present invention provides the use of a catalyst comprising micropores and mesopores wherein the micropore volume ($v_{micro}$) is from 1% to 50% of the total volume ($v_{pore}$) of micropores and mesopores to produce branched fatty acids from a feedstock comprising unsaturated fatty acids.

Any aspect of the present invention may include any of the features described herein, regardless of whether that feature is described with regard to that aspect of the invention or otherwise (e.g. the feature may be referred to in another aspect of the invention, the background or the examples).

DETAILED DESCRIPTION

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

References to any fatty acids herein also include the alkyl esters thereof. Thus, alkyl esters of the unsaturated fatty acids herein described may also be used in the starting material. Although the alkyl moiety may be up to half of the total carbon number, normally it will be 1 to 3, preferably 1 carbon atom(s). Specific examples of alkyl esters include methyl esters, ethyl esters and propyl esters of unsaturated fatty acids, with methyl esters being preferred.

Many of the chemicals which may be used in the present invention are obtained from natural sources. Such chemicals typically include a mixture of chemical species due to their natural origin. Due to the presence of such mixtures, various parameters defined herein can be an average value and may be non-integral.

It will be understood that any reference herein to a physical property of the described zeolite also encompass a physical property of a suitable zeotype material, unless otherwise stated.

The IUPAC pore classification (IUPAC. Compendium of Chemical Terminology, 2nd Ed. compiled by A. D. McNaught and A. Wilkinson. Blackwell Scientific Publications, Oxford 1997) has been used to describe and classify zeolite pore size into 3 groups—micropores, mesopores & macropores. Assuming cylindrical shape, zeolite pores are grouped according to their diameter as shown in Table 1:

TABLE 1

|  | Micropore | Mesopore | Macropore |
| --- | --- | --- | --- |
| Pore diameter (nm) | Below 2 | Between 2 and 50 | Above 50 |

References herein to micropores, mesopores & macropores are according to the IUPAC pore diameter definition as shown in Table 1.

Catalyst

The catalyst of the present invention has a structure which comprises micropores and mesopores. More especially, the present invention provides a catalyst, wherein the catalyst comprises micropores and mesopores and wherein the micropore volume ($v_{micro}$) is from 1% to 50% of the total pore volume ($v_{pore}$) of micropores and mesopores. Advantageously, the catalyst has pores (e.g. micropores) which are small enough to retard dimerisation of unsaturated fatty acids and coke formation within the catalyst pore structure or in the pore mouth, and pores (e.g. mesopores and/or macropores) which are large enough to allow rapid diffusion of branched chain fatty acids or esters thereof out of the catalyst. As such, the catalyst is optimised to provide desirable shape selectivity and desirable product yields when in use.

The catalyst may be an aluminosilicate, preferably a crystalline aluminosilicate. Preferably the catalyst has the general formula $M^{n+}_{x/n}[AlO_2]_x(SiO_2)_{y(y>x)}]\cdot zH_2O$, where M is a metal cation of groups IA (i.e. the alkali metals, and also including hydrogen) or IIA (i.e. the alkaline earth metals), and n is the valency of the metal. The zeolite preferably comprises a microporous network of $SiO_4$ and $AlO_4$ tetrahedra linked together via shared oxygen atoms. The aluminium preferably has a 3+ valency resulting in an excess negative charge on the $AlO_4$ tetrahedra, which can be compensated by $H^+$ or other cations, e.g. $Na^+, NH_4^+, Ca^{2+}$. When M is hydrogen, the materials are Bronsted acidic, whereas when M is, for example, caesium, the materials are basic. Upon heating, Bronsted acidic hydroxyls may condense creating co-ordinately unsaturated Al, which acts as a Lewis acid site. The acid strength, acid site density and distribution, and Bronsted versus Lewis acidity may be influenced by the level of framework aluminium.

The silica ($SiO_2$) to alumina ($Al_2O_3$) molar ratio (SAR) of the catalyst may be varied by controlled calcination, with or without the presence of steam, optionally followed by extraction of any resulting aluminium dislodged from the catalyst framework. The SAR may be varied by chemical treatment employing, for example, ammonium hexafluorosilicate. Alternatively, the SAR can be controlled within limits at the manufacturing stage by variation of the reactant stoichiometry. The catalysts used in the present invention may have a SAR of at least 3, preferably at least 5, more preferably at least 10, particularly at least 15, desirably at least 20. The zeolite may have a SAR of at most 200, preferably at most 180, more preferably at most 140, particularly at most 100, desirably at most 90. The zeolite may have a SAR in the range from 3 to 200, more preferably 10 to 140, and particularly 15 to 100. The SAR may be determined by atomic absorption spectroscopy.

Most suitably, the catalyst may be an aluminosilicate material selected from a zeolite or zeotype material. As such, preferably the catalyst may comprise a zeotype material. Zeotype materials may provide the same physical characteristics as zeolites such as crystallinity, pore structure, and acidity, but they can incorporate other atoms in their crystal structure, often having the effect of modifying acidity while retaining similar pore distributions; this can be desirable in some catalytic reactions, for example where high acidity can reduce desirable product yield. Examples of zeotypes are silicoaluminophosphate materials, commonly referred to as SAPO materials, which incorporate phosphate sites into their structure as well as silica and alumina tetrahedra. It will be understood that any zeotype which has acidity, diffusion and pore size characteristics similar to those of the zeolites described here may be used. Furthermore, a mix of zeotype and zeolite materials may provide an optimised catalyst, where pore size and structure and acidity can be balanced between the two materials to provide optimised selectivity and product yield. Alternatively, the catalyst may not comprise zeotype material.

The catalyst may be a hierarchical zeolite or a zeotype material. A hierarchical zeolite or zeotype material is characterised by the combination of micropores with one or more types of larger pore (mesopores and/or macropores). The reaction catalysed by the zeolite or zeotype material may occur within the micropores. The overall rate of reaction may be improved by increased diffusion due to the connection of the micropores to the external surface of the zeolite or zeotype material via the larger mesopores and/or macropores. The mesopores and/or macropores may be intracrystalline and/or intercrystalline.

Preferably the catalyst is a zeolite.

Zeolites may be classified by the number of member atoms in the rings which form channels or pores (commonly referred to as T atoms). Preferably the zeolite comprises channels or pores with 10 member rings (i.e. $T_{10}$ rings). Such zeolites belong to the class of medium-pore zeolites, as such, preferably the zeolite is a medium-pore zeolite. Examples of medium-pore zeolites include members of the MFI, TON and FER framework types. Preferably, the zeolite is selected from ZSM-5, ZSM-22 and Ferrierite, and more preferably selected from ZSM-5 and ZSM-22. Suitably, the zeolite may comprise pentasil units, and preferably the zeolite is a pentasil zeolite. Most preferably the zeolite comprises a ZSM-5 structure. The zeolite may be a ZSM-5 zeolite (i.e. the isomerisation catalyst may consist of ZSM-5 zeolite). The zeolite may not comprise a Beta zeolite structure (member of the BEA framework type). The zeolite may not comprise a Ferrierite zeolite structure (member of the FER framework type). The zeolite may not comprise channels or pores with 12 member rings (i.e. $T_{12}$ rings); such materials do not provide optimised product shape selectivity.

As will be appreciated from the comments made above, more preferably the zeolite catalyst is an MFI type zeolite, and most preferably the zeolite comprises a ZSM-5 zeolite. A suitable ZSM-5 zeolite may be made according to the method disclosed in U.S. Pat. No. 3,702,886, the contents of which is incorporated herein by reference, and more preferably the ZSM-5 zeolite is modified in accordance with the method provided below.

Although it is preferable from the viewpoint of catalyst activity that the cation in the zeolite is a proton, a zeolite of the potassium, ammonium or similar type, may be used after being converted, either partially or completely, into the proton type by suitable methods such as ion exchange and/or calcination.

The amount of acid sites in the catalyst (e.g. amount per gram) may have a significant effect on the ability of a given weight of catalyst to catalyse the production of branched fatty acids. The amount of acid sites may be measured by ammonia Temperature Programmed Desorption (TPD). Ammonia TPD comprises firstly adsorbing ammonia onto a catalyst sample and secondly the controlled heating of the sample whilst monitoring the evolution of ammonia from the sample back into the gas phase, preferably using an automated chemisorption analyser. The chemisorption analyser may be a Micromeritics TPD/TPR 2900 apparatus.

The ammonia TPD method used in the present invention involves adsorbing ammonia onto the surface of a catalyst sample and then heating the sample from room temperature of about 20° C. (293 K) to 550° C. (823 K) and measuring the evolution of ammonia from the sample. The total amount of ammonia desorbed from the sample between 20° C. and 550° C. will be referred to as 'total $NH_3$ uptake' and is an indication of the total amount of acid sites in the catalyst. It is measured in µmol/g. The catalyst may have a total $NH_3$ uptake of at least 100 µmol/g, preferably at least 150 µmol/g, more preferably at least 200 µmol/g, desirably at least 250 µmol/g, particularly at least 300 µmol/g. The catalyst may have a total $NH_3$ uptake of at most 1000 µmol/g, preferably at most 900 µmol/g, more preferably at most 800 µmol/g, desirably at most 700 µmol/g. Preferably the ammonia TPD method is as described herein in the test methods.

According to the present invention, it is preferable to create or maintain acid sites in the catalyst which improve the capacity of the catalyst to isomerise unsaturated fatty acids to produce branched fatty acids; it is believed that presence of acid sites is desirable to allow the catalyst to be suitable as an isomerisation catalyst. The invention recognises that such acid sites have a strong affinity for ammonia, indicating that they are 'strong' acid sites. The amount of strong acid sites may be measured by the amount of ammonia desorption above a certain minimum temperature, in this case selected as 327° C. (600 K). This higher minimum temperature for desorption indicates the ammonia has been held more strongly by the acid site. Therefore, the amount of ammonia desorbed from the sample between 327° C. and 550° C. will be referred to as 'strong $NH_3$ uptake' and is an indication of the amount of strong acid sites in the catalyst. Both zeolite and zeotype catalysts are known with and without the presence of both weak and strong acid sites, and in the present case materials with strong acid sites are preferred. In the present case the preferred zeolite catalyst may have a strong $NH_3$ uptake of at least 50 µmol/g, preferably at least 100 µmol/g, more preferably at least 150 µmol/g, desirably at least 200 µmol/g, particularly at least 250 µmol/g. Additionally, the preferred zeolite catalyst may have a strong $NH_3$ uptake of at most 900 µmol/g, preferably at most 800 µmol/g, more preferably at most 700 µmol/g, desirably at most 600 µmol/g. Materials which a too acidic may result in lower yields of desirable products when in use.

In addition to acidity characteristics, there are a number of physical (textural or structural) properties, e.g. surface area and pore volume, which may influence the catalytic activity of the present isomerisation catalyst. The surface area and/or pore volume of the catalyst may be measured by nitrogen physisorption. The surface area and/or pore volume may be calculated based on BET (Brunauer-Emmett-Teller) theory. Surface area may be calculated as the total surface area of the zeolite ($S_{total}$) which may then be divided into micropore surface area ($S_{micro}$), mesopore surface area ($S_{meso}$) and macropore surface area ($S_{macro}$) using the empirical t-plot method. Alternatively, mesopore surface area and macropore surface area may be combined as external surface area ($S_{external}$) such that $S_{total}=S_{micro}+S_{external}$. Preferably specific surface areas are measured according to ISO 9277.

The catalyst may have a surface area ($S_{total}$) of at least 300 m²/g, preferably at least 400 m²/g, more preferably at least 450 m²/g, desirably at least 500 m²/g. The catalyst may have a surface area ($S_{total}$) of at most 800 m²/g, preferably at most 700 m²/g, more preferably at most 650 m²/g, desirably at most 600 m²/g. This surface area may be measured by nitrogen physisorption, preferably using BET theory, more preferably using the empirical t-plot method.

The catalyst may have an external surface area ($S_{external}$) of at least 80 m²/g, preferably at least 120 m²/g, more preferably at least 140 m²/g, desirably at least 160 m²/g. The zeolite may have an external surface area ($S_{external}$) of at most 600 m²/g, preferably at most 500 m²/g, more preferably at most 400 m²/g. This external surface area may be measured by nitrogen physisorption, preferably using BET theory, more preferably using the empirical t-plot method.

Nitrogen physisorption and the empirical t-plot method may also be used to measure micropore volume ($V_{micro}$), mesopore volume ($V_{meso}$) and total pore volume ($V_{pore}$) such that $V_{pore}=V_{micro}+V_{meso}$.

The catalyst may have a total pore volume ($V_{pore}$) of at least 0.4 cm³/g, preferably at least 0.5 cm³/g, more preferably at least 0.6 cm³/g, desirably at least 0.7 cm³/g. The catalyst may have a total pore volume ($V_{pore}$) of at most 2 cm³/g, preferably at most 1.8 cm³/g, more preferably at most 1.6 cm³/g, desirably at most 1.4 cm³/g. This total pore volume may be measured by nitrogen physisorption, preferably using the empirical t-plot method.

The catalyst may have a micropore volume ($V_{micro}$) of at least 0.05 cm³/g, preferably at least 0.08 cm³/g, more preferably at least 0.1 cm³/g. The catalyst may have a micropore volume ($V_{micro}$) of at most 0.4 cm³/g, preferably at most 0.3 cm³/g, more preferably at most 0.2 cm³/g. This micropore volume may be measured by nitrogen physisorption, preferably using the empirical t-plot method.

In the isomerisation catalyst of the present invention the micropore volume ($V_{micro}$) is from 1% to 50% of the total pore volume ($V_{pore}$) of micropores and mesopores. Furthermore, the level of the change in this pore property expressed as a % ratio may give an indication of the amount of structural modification which has occurred within a zeolite when the modified zeolite is compared with an unmodified zeolite, as described below. The micropore volume ($V_{micro}$) may be at least 2% of total pore volume ($V_{pore}$), preferably at least 4%, more preferably at least 6%, particularly at least 8%. The micropore volume ($V_{micro}$) may be at most 45% of total pore volume ($V_{pore}$), preferably at most 40%, more preferably at most 30%, particularly at most 25%.

In isomerisation reactions of fatty acids (and/or alkyl esters thereof) to produce branched fatty acids, a high rate of production of branched fatty acid does not correlate directly with the catalyst high total surface area or with the catalyst high total $NH_3$ uptake property. Surprisingly, it has been found that higher production of branched fatty acids can be achieved when the external surface area ($S_{external}$ in m²/g) and the density of strong acid sites (strong $NH_3$ uptake in µmol/g) properties are combined into an activity factor. The activity factor is calculated as shown in formula (I):

$$\text{activity factor}=S_{external}\times\text{strong NH}_3\text{ uptake} \quad (I)$$

wherein:

"$S_{external}$" is the external surface area in m²/g of the zeolite, measured by nitrogen physisorption; and "strong $NH_3$ uptake" is the amount of $NH_3$ in µmol/g which desorbs from the zeolite at a temperature between 327° C. and 550° C. during ammonia temperature programmed desorption.

The catalyst of the invention has an activity factor according to formula (I) of at least 30,000, preferably at least 40,000, more preferably at least 50,000, particularly at least 60,000, desirably at least 70,000, especially at least 80,000. The catalyst of the invention may have an activity factor of at most 200,000, preferably at most 180,000, more preferably at most 160,000, particularly at most 140,000.

Method of Making a Zeolite

There is also provided herewith a method of making a suitable isomerisation zeolite catalyst. Different methods may be used to obtain a zeolite according to the present invention. Suitable methods can be broadly categorised into two groups—direct synthesis and post-synthesis modification. A post-synthesis modification method is preferred for introducing mesopores and/or macropores to enhance diffusion from the external surface of the zeolite to the existing micropores. This method has the additional benefit of being able to use a wide variety of existing zeolites as starting materials.

As such, the present invention provides a method of modifying the structure of a zeolite comprising the steps of:

i) contacting the zeolite with an alkaline solution, preferably comprising NaOH;

ii) contacting the zeolite with an acidic solution, preferably comprising HCl; and iii) contacting the zeolite with an ion exchange material.

Suitably the ion exchange material may be an ion exchange resin or ion exchange solution. Use of an ion exchange solution is preferred, and preferably the ion exchange solution comprises $NH_4NO_3$.

Preferably, the alkaline solution and/or the acidic solution and/or the ion exchange solution is employed at a concentration of under 1 M (molar). The alkaline solution may be at a concentration from 0.1 M to 2 M, preferably from 0.2 M to 1.5 M, more preferably from 0.3 M to 0.9 M. The acidic solution may be at a concentration from 0.05 M to 0.5 M, preferably from 0.05 M to 0.2 M. The ion-exchange solution may be at a concentration from 0.05 M to 0.5 M, preferably from 0.05 M to 0.2 M. The alkaline solution may consist of NaOH and water. The acid solution may consist of HCl and water. The ion exchange solution may consist of $NH_4NO_3$ and water.

The method preferably further comprises the step of:
iv) calcining the zeolite at a temperature of at least 400° C. for at least 2 hours.

A zeolite as described herein may be obtainable by the method described herein and is preferably obtained by such a method, that is to say that a known zeolite is selected and modified in accordance with the present method to render it suitable as an isomerisation catalyst in accordance with the present invention. Preferably the unmodified zeolite comprises a ZSM-5 structure, and this structure is maintained in the modified zeolite. Preferably the modified zeolite obtainable or obtained by the method comprises micropores and mesopores wherein the micropore volume ($V_{micro}$) is from 1% to 50% of the total pore volume ($V_{pore}$) of micropores and mesopores.

The method of modifying the zeolite may comprise increasing the external surface area of the zeolite. The method may comprise increasing the mesopore volume of the zeolite. The method may comprise decreasing the percentage of total pore volume which is micropore volume ($V_{micro}$ as % of $V_{pore}$) of the zeolite.

Process for Producing Branched Fatty Acids

The invention provides a process for producing branched fatty acids from a starting material (feedstock) comprising fatty acids which comprises the steps of:
i) contacting a starting material comprising unsaturated fatty acids with a catalyst; and
ii) using the catalyst to isomerise an amount of the unsaturated fatty acids to form a composition comprising branched fatty acids;
wherein the catalyst comprises micropores and mesopores and wherein the micropore volume ($V_{micro}$) is from 1% to 50% of the total volume ($V_{pore}$) of micropores and mesopores.

The raw materials for the starting material (feed stock) used in the present invention are preferably naturally occurring materials such as triglyceride oils and can be of animal (e.g. tallow), or more preferably of vegetable origin. Suitable fatty acids include sunflower fatty acids, soybean fatty acids, olive fatty acids, rapeseed fatty acids, linseed fatty acids, cottonseed fatty acids, safflower fatty acids, tall oil fatty acids and tallow olein. Relatively pure unsaturated fatty acids such as oleic acid, linoleic acid, linolenic acid, palmitoleic acid, erucic acid, and elaidic acid may be isolated and used, or relatively crude unsaturated fatty acid mixtures employed. The unsaturated fatty acids in the starting material may comprise high oleic sunflower fatty acid. The unsaturated fatty acids may be partially hydrogenated. For example, the unsaturated fatty acids in the starting material may comprise partially hydrogenated olive oil or olive fatty acid.

Alkyl esters may be present in the starting material. When alkyl esters are used in the starting material, the starting material contains at least one alkyl ester of the herein described unsaturated fatty acids. In the case of a mixture of materials being present in the starting material including alkyl esters, the content of alkyl esters of the herein described unsaturated fatty acids is preferably greater than 50% by weight, more preferably greater than 80% by weight, and especially greater than 90% by weight of the starting material.

The starting material suitably comprises $C_{12}$-$C_{24}$ unsaturated fatty acids, preferably $C_{14}$-$C_{22}$ unsaturated fatty acids, more preferably $C_{16}$-$C_{22}$ unsaturated fatty acids, particularly $C_{18}$ or $C_{22}$ unsaturated fatty acids, and especially $C_{18}$ unsaturated fatty acids.

The starting material suitably comprises greater than 70%, preferably greater than 80%, more preferably greater than 90%, particularly greater than 95%, and especially greater than 97% by weight of fatty acids. The starting material suitably comprises (i) greater than 70%, preferably greater than 75%, more preferably in the range from 80 to 99%, particularly 85 to 97%, and especially 90 to 95% by weight of unsaturated fatty acids; and/or (ii) less than 30%, preferably less than 25%, more preferably in the range from 1 to 20%, particularly 3 to 15%, and especially 5 to 10% by weight of saturated fatty acids, both based on the total weight of fatty acids present.

The unsaturated fatty acid component comprises at least one ethylenic double bond but may comprise two or even three double bonds. The unsaturated fatty acid component suitably comprises (i) greater than 50%, preferably greater than 60%, more preferably in the range from 80 to 100%, particularly 85 to 98%, and especially 90 to 95%, by weight of fatty acids having one double bond; and/or (ii) less than 50%, preferably less than 40%, more preferably in the range from 0 to 20%, particularly 2 to 15%, and especially 5 to 10% by weight of fatty acids having 2 or 3, preferably 2, double bonds, both based on the total weight of unsaturated fatty acids present.

Suitably, the catalyst of step ii) is an isomerisation catalyst as described herein. Preferably the catalyst is a zeolite or zeotype material. Most preferably a zeolite may be used as the isomerisation catalyst.

The catalyst may be used at a concentration (loading level) of at least 0.1%, preferably at least 0.2%, more preferably at least 0.6%, particularly at least 0.8% by weight based on the total weight of fatty acids in the starting material. The catalyst may be used at a concentration (loading level) of at most 10%, preferably at most 8%, more preferably at most 6%, particularly at most 4%, desirably at most 2.8%, especially at most 2.4%, possibly at most 1.8% by weight based on the total weight of fatty acids in the starting material.

The isomerisation reaction in step ii) may occur for (have a duration of) at least 0.5 hours, preferably at least 1 hour, more preferably at least 2 hours, particularly at least 3 hours, desirably at least 5 hours, especially at least 6.25 hours. The isomerisation reaction in step ii) may occur for at most 15 hours, preferably at most 12 hours, more preferably at most 10 hours, particularly at most 8 hours.

The isomerisation reaction in step ii) may be carried out at a temperature of at least 180° C., preferably at least 210° C., more preferably at least 240° C., particularly at least 250° C. The isomerisation reaction may be carried out at a temperature of at most 340° C., preferably at most 300° C., more preferably at most 280° C., particularly at most 270° C.

The process may be carried out in a closed system, preferably a batch system, for example in an autoclave, where the system can be pressurized. A suitable pressure is 2 to 50 kgf/cm². The reaction mixture may be flushed out (purged), and pressurized, with a gas such as nitrogen or hydrogen, preferably nitrogen is used due to its inert nature. The use of a closed system will prevent vaporization of water, alcohols and any other low boiling substances in the system, including any contained in the catalyst.

The isomerisation reaction of step ii) may be carried out in the presence of water or a lower alcohol. This is to suppress acid anhydride formation due to dehydration or dealcoholation of the starting material. It is preferable to add water when the starting material is mostly unsaturated fatty acids; and a lower alcohol when the starting material is mostly alkyl esters of unsaturated fatty acids. The lower alcohol used suitably comprises 1 to 3 carbon atoms, with methanol, ethanol, and propanol being particularly preferred. The lower alcohol preferably has the same alkyl group as that of the fatty acid ester starting material.

The isomerisation reaction may be carried out in the absence of a Lewis base, preferably the isomerisation reaction mixture does not comprise a Lewis base. Alternatively, the isomerisation reaction may occur in the presence of a Lewis basis, and in this case the Lewis base may be an amine or phosphine, particularly an organoamine or organophosphine, and especially triphenylphosphine.

The conversion rate, i.e. the % by weight of the unsaturated fatty acid in the starting material which is reacted in the isomerisation reaction may be at least 20%, preferably at least 30%, more preferably at least 40%, particularly at least 50%, desirably at least 60% by weight, based on the initial weight of the unsaturated fatty acid. The conversion rate may be at most 98%, preferably at most 95%, particularly at most 90% by weight.

Preferably the composition comprising branched fatty acids comprises at least 20 wt % of branched fatty acids after 6.25 hours of isomerisation reaction.

Further method steps may be employed to purify or modify the fatty acid product. In addition, the isomerisation catalyst may be removed. Such further method steps are now discussed.

Oligomeric fatty acids may be removed from the composition comprising branched fatty acids in a further step, for example by vacuum distillation. This step may be carried out at up to 230° C. This step may be carried out at under 10 mbar. Where a subsequent hydrogenation step (as described below) is employed, the oligomeric fatty acids may be removed prior to hydrogenation.

The isomerisation catalyst may be separated from the composition, for example by filtration, preferably using a pressurized filtration unit with carton depth filter, and preferably reused as described herein. Where a hydrogenation step is employed (as describe below) the hydrogenation catalyst may be separated from the composition in a similar way; preferably the hydrogenation catalyst may be employed after removal of the isomerisation catalyst to aid in the recovery, reusability or recycling of the different catalysts. Alternatively, one or more of the isomerisation and hydrogenation catalysts may be provided in a fixed bed arrangement so that the need catalyst separation is reduced.

The composition comprising branched fatty acids produced in step ii) is also optionally hydrogenated, for example in an autoclave by a known method, such as the method using a hydrogenation catalyst, particularly a metal hydrogenation catalyst. Catalysts for hydrogenation are well known and can be homogeneous or heterogeneous (i.e. the catalyst is present in a different phase, typically the solid phase, as compared to the reactant/product stream or substrate, typically in the liquid phase). Useful metal hydrogenation catalysts include nickel, copper, palladium, platinum, molybdenum, iron, ruthenium, osmium, rhodium, iridium, zinc or cobalt, and particularly zinc. Combinations of catalysts can also be used. Bimetallic catalysts can be used, for example, palladium-copper, palladium-lead, nickel-chromite.

The metal hydrogenation catalysts can be utilized with promoters that may or may not be other metals. Typical metal catalysts with promoter include, for example, nickel with sulphur or copper as promoter; copper with chromium or zinc as promoter; zinc with chromium as promoter; or palladium on carbon with silver or bismuth as promoter.

In one embodiment, a nickel catalyst that has been chemically reduced with hydrogen to an active state can be used as a hydrogenation catalyst. Commercial examples of supported nickel hydrogenation catalysts include those available under the trade names "Nysofact," "Nysosel," and "NI 5248 D" (ex Engelhard Corporation). Other supported nickel hydrogenation catalysts include those commercially available under the trade names "Pricat™ 9910," "Pricat™ 9920," "Pricat™ 9908" and "Pricat™ 9936" (ex Johnson Matthey).

Suitable metal hydrogenation catalysts may be used as fine dispersions in the present hydrogenation reaction (slurry phase environment). For example, in some embodiments, the particles of supported nickel catalyst are dispersed in a protective medium comprising hardened triacylglyceride, edible oil, or tallow. The supported nickel catalyst may be dispersed in the protective medium at a level of about 22 wt % nickel.

The hydrogenation catalysts may be impregnated on solid supports. Some useful supports include carbon, silica, alumina, magnesia, titania and zirconia. Examples of supported catalysts include palladium, platinum, rhodium or ruthenium on carbon or alumina support; nickel on magnesia, alumina or zirconia support; palladium on barium sulphate support; or copper on silica support. The hydrogenation catalysts may be supported nickel or sponge nickel type catalysts. In some embodiments, the catalyst comprises nickel that has been chemically reduced with hydrogen to an active state (i.e. reduced nickel) provided on a support. The support may comprise porous silica (e.g. kieselguhr, infusorial, diatomaceous, or siliceous earth) or alumina.

These catalysts can be characterized by a high nickel surface area per gram of nickel.

The hydrogenation catalyst is suitably used at a concentration of less than 10%, preferably less than 5%, more preferably less than 3%, particularly in the range from 0.5 to 2%, and especially 0.8 to 1.2% by weight based on the weight of composition.

Additionally, the composition comprising branched fatty acids may optionally be processed to separate branched and linear fatty acids. The final product composition may be produced after a separation step to remove a fraction of linear fatty acids, that is to say that the composition may be refined, however, the requirement to refine the product will depend upon its intended final use. The separation step may comprise a solvent-based process, a wet separation process (using water and surfactant) or a dry separation process. Each of these processes enables the removal of a fraction of linear fatty acids to produce a final product composition.

Composition Comprising Branched Fatty Acids

A composition comprising branched fatty acids is provided which may be obtainable by, and preferably is obtained by, a process as described above.

The composition may comprise branched fatty acids and a catalyst as described herein. In the case that the catalyst is the zeolite catalyst described herein then the presence of the zeolite catalyst has been found to provide no detrimental effects on the downstream uses of the branched fatty acid composition. However, it may be preferred that the level of catalyst (zeolite) be reduced by an active catalyst removal step, as described above to provide a higher purity fatty acid product.

Suitably, the composition may comprise at least 20 wt %, preferably at least 30 wt %, more preferably at least 35 wt %, particularly at least 40 wt %, desirably at least 42 wt %, especially at least 44 wt % of branched fatty acids, preferably C18 branched fatty acids. The composition may comprise at most 90 wt %, preferably at most 80 wt %, more preferably at most 70 wt % of branched fatty acids, preferably C18 branched fatty acids.

The composition may comprise at least 1 wt %, preferably at least 2 wt %, more preferably at least 5 wt %, particularly at least 10 wt %, especially at least 12 wt % of oligomeric fatty acids such as dimer acid and trimer acid. The composition may comprise at most 30 wt %, preferably at most 25 wt %, more preferably at most 20 wt % of oligomeric fatty acids. Alternatively, the composition may comprise less than 5 wt %, preferably less than 2 wt %, more preferably less than 1 wt % of oligomeric fatty acids.

The final product composition preferably (i) has an acid value (measured as described herein) in the range from 145 to 210, more preferably 160 to 205, particularly 175 to 200, and especially 185 to 195 mgKOH/g, and/or (ii) a saponification value (measured as described herein) in the range from 165 to 220, more preferably 175 to 210, particularly 185 to 200, and especially 190 to 195 mgKOH/g, and/or (iii) has an unsaponifiable content (measured as described herein) of less than 10, more preferably less than 5, particularly in the range from 1.0 to 3, and especially 1.5 to 2 g/100 g, and/or (iv) an iodine value (measured as described herein) of less than 5, more preferably less than 3, particularly in the range from 1 to 2, and especially 1 g iodine/100 g, and/or (v) has a cloud point (measured as described herein) in the range from −10 to 25° C., more preferably −5 to 20° C., particularly 0 to 10° C., and especially 3 to 6° C., and/or (vii) a colour (measured as described herein) of less than 200, more preferably less than 150, particularly less than 100, and especially less than 75 Hazen units.

A typical final product composition is given below:

| Component | Final product after isomerisation, distillation and hydrogenation (% by Weight) |
| --- | --- |
| C18 branched | 65.2 |
| Linear C16 | 6.2 |
| Linear C18 | 2.2 |
| Lactones $_{(branched + linear)}$ | 1.1 |
| Oligomer | 0 |
| Others | 25.3 |

Use of the Isomerisation Catalyst

The invention also provides the use of a catalyst comprising micropores and mesopores wherein the micropore volume ($v_{micro}$) is from 1% to 50% of the total volume ($v_{pore}$) of micropores and mesopores to produce branched fatty acids from a feedstock comprising unsaturated fatty acids.

The catalyst is preferably a zeolite as described herein.

Any or all of the features described herein, and/or any or all of the steps of any method or process described herein, may be used in any combination in any aspect of the invention.

EXAMPLES

The present invention is illustrated by the following non-limiting Examples. All parts and percentages are given by weight unless otherwise stated.

It will be understood that all tests and physical properties have been determined at atmospheric pressure and room temperature (i.e. about 20° C.), unless otherwise stated herein, or unless otherwise stated in the referenced test methods and procedures.

Test Methods

In this specification the following test methods have been used:

(i) Acid Value

The acid value was measured using the A.O.C.S. (The American Oil Chemists' Society) Official method Te 1a-64 (Reapproved 1997) and expressed as the number of milligrams of potassium hydroxide required to neutralise the free fatty acids in one gram of sample.

(ii) Saponification Value

The saponification value was determined using the A.O.C.S. Official Method TI 1a-64 (1997) and is defined as the number of milligrams of potassium hydroxide which reacts with one gram of sample under the prescribed conditions.

(iii) Unsaponifiable Value

The unsaponifiable value was measured using the A.O.C.S. Official Method, Ca6b-53 (1989).

(iv) Iodine Value

The iodine value was determined by the Wijs method, the A.O.C.S. Official Method Tg 1-64 (1993) and expressed as the number of grams of iodine absorbed by 100 grams of sample under the defined test conditions.

(v) Cloud Point

The cloud point was measured according to the A.O.C.S. Official Method (Cc 6-25).

(vi) Solidification Point

The solidification point was measured according to the A.O.C.S. Official Method (Cc 12-59).

(vii) Colour

Colour was determined using the Method of Colour Determination in Hazen Units (Pt-Co scale), ISO 2211 (1973).

(viii) Fatty Acid Composition

The fatty acid composition (chain length, saturated/unsaturated, linear/branched) was determined using gas chromatography, using the method ISO 5508:1990(E) Animal and vegetable fats and oils—Analysis by gas chromatography of methyl esters of fatty acids. Analyses were carried out after hydrogenation at laboratory scale in order to simplify the compositional analyses.

(ix) Zeolite Pore Volumes and Surface Areas

The following zeolite properties were measured by low temperature nitrogen physisorption using a Quantachrome Autosorb 6B automated adsorption analyser.

Prior to these measurements, the samples are degassed at 350° C. in vacuum for approx. 16 h.

Specific surface areas were measured according to ISO 9277. The total surface area ($S_{total}$) was determined based on the BET (Brunauer-Emmett-Teller) theory. The micropore surface area ($S_{micro}$) was calculated from the nitrogen physisorption data based on the empirical t-plot method. The external surface area ($S_{external}$) i.e. sum of mesopore+macropore surface area is derived by subtracting the calculated micropore surface area from the total surface area i.e. ($S_{external}$)=($S_{total}$)-($S_{micro}$)

Total pore volume ($V_{pore}$) was measured by nitrogen physisorption. The micropore volume ($V_{micro}$) was calculated from the nitrogen physisorption data based on the empirical t-plot method. The mesopore volume ($V_{meso}$) is derived by subtracting the calculated micropore volume from the total pore volume i.e. ($V_{meso}$)=($V_{pore}$)-($V_{micro}$)

(x) Zeolite Acid Sites

The measurement of acid sites in the zeolite was determined by ammonia temperature programmed desorption (TPD). The apparatus used was an automated chemisorption analyser model TPD/TPR 2900 supplied by Micromeritics Instrument Corporation. Pre-treatment of the samples before measurement comprises:
1. Drying by heating up to 550° C. under helium,
2. Cooling to 200° C. (473 K) under helium,
3. Adsorption of ammonia at 200° C. (473 K)) and desorption of any physiosorbed ammonia at the same temperature.

The measurement procedure comprises:
1. The sample is heated from room temperature to 550° C. (823 K) in helium, using a ramp rate of 10 K min-1; the sample is kept at 823 K for 30 min in flowing helium, before being cooled in helium to 200° C. (473 K);
2. The sample is then flushed with ammonia for 10 min and with helium for 10 min. This procedure is repeated 3 times. After the third flushing step, the sample is held constant until a stable baseline is obtained;
3. Finally, desorption of ammonia is monitored in the temperature range 473-823 K (ramp rate 10 K min-1).

The quantities measured were:
A. Total $NH_3$ uptake—all $NH_3$ desorbed up to 550° C. (823 K)—provides a measure of the total amount of acid sites;
B. strong $NH_3$ uptake—$NH_3$ desorbed between 327° C. (600 K) and 550° C. (823 K)—provides a measure of the amount of strong acid sites.

Ammonia that desorbed at a temperature lower than 600K was considered to have adsorbed to a weak acid site. Ammonia that desorbed at a temperature between 327° C. (600 K) and 550° C. (823 K) was considered to have adsorbed to a strong acid site, hence the higher temperature required to desorb it.

Zeolite Samples

Three commercially available samples of ZSM-5 type zeolite were obtained with characteristics shown in Table 2.

TABLE 2

| ZSM-5 Type Zeolite | SAR | Approx. Crystal size | Isomerisation performance tested in |
| --- | --- | --- | --- |
| Zeolite A | 27 | 1000 nm | Comparative Example 3 |

TABLE 2-continued

| ZSM-5 Type Zeolite | SAR | Approx. Crystal size | Isomerisation performance tested in |
| --- | --- | --- | --- |
| Zeolite B | 23 | 250 nm | Comparative Example 6 |
| Zeolite C | 80 | 500 nm | Comparative Example 9 |

The silica/alumina ratio (SAR) value and crystal size of these zeolite catalysts is published by the supplier.

Example 1: Modification of Zeolite A—Alkali and Acid Treatment 180 ml 0.7 M NaOH solution was heated to 65° C. in a round bottom flask equipped with stirrer. 6 g Zeolite A was added. After 2 hours of this alkali treatment the reaction mix was quenched by immersion of the reactor in an ice-water mixture. The zeolite was separated from the solution by centrifuging the mix at 4000 rpm for 10 minutes, subsequently washed with distilled water until pH neutral and dried. The dried zeolite was acid washed 2 times with 0.1 M HCl solution at 65° C. for 5 h. The zeolite was separated from the solution by centrifuging the mix at 4000 rpm for 10 minutes, subsequently washed with distilled water until pH neutral and dried. The dried zeolite was treated with 0.1 M ion exchange solution $NH_4NO_3$ for 4 cycles of 6 h, 16 h, 6 h and 16 h. After each cycle the zeolite was isolated by filtration and resuspended in fresh ion exchange solution. The zeolite was subsequently washed with distilled water until pH neutral and dried. The zeolite was calcined prior to use for 5 h at 500° C.

The resulting modified catalyst is referred to as Zeolite Mod A.

Example 2: Isomerisation of Fatty Acid With Zeolite Mod A 25 g of high oleic sunflower fatty acid (comprising 4% 016:0, 2.6% 018:0, 81.4% C18:1 and 9.7% C18:2 fatty acids by weight), 0.25 g Zeolite Mod A (from Example 1) and 0.4 g water were charged to a 50 ml autoclave. 0.25 g zeolite in 25 g fatty acid is equivalent to 1 wt % of zeolite based on the total weight of fatty acids in the starting material. The reaction mixture was flushed 3 times with nitrogen and pressurized with nitrogen to 1 bar. The reaction mixture was heated to 260° C. After 5.5 hours, the reaction mixture was cooled to 80° C. and filtered using filter paper. The resultant filtrate was analysed and had the following composition;

| Component | % by Weight* |
| --- | --- |
| C18 branched | 46.2 |
| Linear C16 | 5.0 |
| Linear C18 | 20.9 |
| Lactones (branched + linear) | 6.3 |
| Oligomer | 13.5 |
| Others | 8.1 |

*analysed after hydrogenation at laboratory scale.

Comparative Example 3: Isomerisation of Fatty Acid With Zeolite A (Unmodified)

For comparison with Example 2, 25 g of high oleic sunflower fatty acid, 0.25 g Zeolite A (unmodified) and 0.4 g water were charged to a 50 ml autoclave. The reaction mixture was flushed 3 times with nitrogen and pressurized with nitrogen to 1 bar. The reaction mixture was heated to 260° C. After 5.5 hours, the reaction mixture was cooled to 80° C. and filtered using filter paper. The resultant filtrate was analysed and had the following composition;

| Component | % by Weight* |
|---|---|
| C18 branched | 1.9 |
| Linear C16 | 4.3 |
| Linear C18 | 82.3 |
| Lactones (branched + linear) | 0.9 |
| Oligomer | 9.7 |
| Others | 0.9 |

*analysed after hydrogenation at the laboratory scale.

Example 4: Modification of Zeolite B—Alkali and Acid Treatment 450 ml 0.8 M NaOH solution was heated to 65° C. in a round bottom flask equipped with stirrer. 15 g Zeolite B was added. After 30 minutes the reaction mix was quenched by immersion of the reactor in an ice-water mixture. The zeolite was separated from the solution by centrifuging the mix at 4000 rpm for 10 minutes, subsequently washed with distilled water until pH neutral and dried. The dried zeolite was acid washed 2 times with 0.1 M HCl solution at 65° C. for 5 h (1 g/100 ml). The zeolite was separated from the solution by centrifuging the mix at 4000 rpm for 10 minutes, subsequently washed with distilled water until pH neutral and dried. The dried zeolite was treated with 0.1 M $NH_4NO_3$ for 4 cycles of 6 h, 16 h, 6 h and 16 h. After each cycle the zeolite was isolated by filtration and resuspended in fresh ion exchange solution. The zeolite was subsequently washed with distilled water until pH neutral and dried. The zeolite was calcined prior to use for 5 h at 500° C.

The resulting modified catalyst is referred to as Zeolite Mod B.

Example 5: Isomerisation of Fatty Acid With Zeolite Mod B 25 g of high oleic sunflower fatty acid, 0.25 g Zeolite Mod B (from Example 4) and 0.4 g water were charged to a 50 ml autoclave. The reaction mixture was flushed 3 times with nitrogen and pressurized with nitrogen to 1 bar. The reaction mixture was heated to 260° C. After 6 hours, the reaction mixture was cooled to 80° C. and filtered using filter paper. The resultant filtrate was analysed and had the following composition;

| Component | % by Weight* |
|---|---|
| C18 branched | 50.7 |
| Linear C16 | 5.8 |
| Linear C18 | 11.6 |
| Lactones (branched + linear) | 5.6 |
| Oligomer | 16.2 |
| Others | 10.1 |

*analysed after hydrogenation at the laboratory scale.

Comparative Example 6: Isomerisation of Fatty Acid With Zeolite B (Unmodified)

For comparison with Examples 5, 25 g of high oleic sunflower fatty acid, 0.25 g Zeolite B (unmodified) and 0.4 g water were charged to a 50 ml autoclave. The reaction mixture was flushed 3 times with nitrogen and pressurized with nitrogen to 1 bar. The reaction mixture was heated to 260° C. After 4 hours, the reaction mixture was cooled to 80° C. and filtered using filter paper. The resultant filtrate was analysed and had the following composition;

| Component | % by Weight* |
|---|---|
| C18 branched | 6.7 |
| Linear C16 | 6.0 |
| Linear C18 | 74.7 |
| Lactones (branched + linear) | 1.5 |
| Oligomer | 9.3 |
| Others | 1.8 |

*analysed after hydrogenation at the laboratory scale.

Example 7: Modification of Zeolite C—Alkali and Acid Treatment 450 ml 0.3 M NaOH solution was heated to 65° C. in a round bottom flask equipped with stirrer. 15 g Zeolite C was added. After 30 minutes the reaction mix was quenched by immersion of the reactor in an ice-water mixture. The zeolite was separated from the solution by centrifuging the mix at 4000 rpm for 10 minutes, subsequently washed with distilled water until pH neutral and dried. The dried zeolite was acid washed 2 times with 0.1 M HCl solution at 65° C. for 5 h (1 g/100 ml). The zeolite was separated from the solution by centrifuging the mix at 4000 rpm for 10 minutes, subsequently washed with distilled water until pH neutral and dried. The dried zeolite was treated with 0.1 M $NH_4NO_3$ for 4 cycles of 6 h, 16 h, 6 h and 16 h. After each cycle the zeolite was isolated by filtration and resuspended in fresh ion exchange solution. The zeolite was subsequently washed with distilled water until pH neutral and dried. The zeolite was calcined prior to use for 5 h at 500° C.

The resulting modified catalyst is referred to as Zeolite Mod C.

Example 8: Isomerisation of Fatty Acid With Zeolite Mod C 25 g of high oleic sunflower fatty acid, 0.25 g Zeolite Mod C (from example 7) and 0.4 g water were charged to a 50 ml autoclave. The reaction mixture was flushed 3 times with nitrogen and pressurized with nitrogen to 1 bar. The reaction mixture was heated to 260° C. After 6.25 hours, the reaction mixture was cooled to 80° C. and filtered using filter paper. The resultant filtrate was analysed and had the following composition;

| Component | % by Weight* |
|---|---|
| C18 branched | 47.1 |
| Linear C16 | 6.0 |
| Linear C18 | 11.3 |
| Lactones (branched + linear) | 5.1 |
| Oligomer | 19.4 |
| Others | 11.1 |

*analysed after hydrogenation at the laboratory scale.

Comparative Example 9: Isomerisation of Fatty Acid With Zeolite C (Unmodified)

25 g of high oleic sunflower fatty acid, 0.25 g Zeolite C (unmodified) and 0.4 g water were charged to a 50 ml autoclave. The reaction mixture was flushed 3 times with nitrogen and pressurized with nitrogen to 1 bar. The reaction mixture was heated to 260° C. After 6.25 hours, the reaction mixture was cooled to 80° C. and filtered using filter paper. The resultant filtrate was analysed and had the following composition;

| Component | % by Weight* |
|---|---|
| C18 branched | 10.4 |
| Linear C16 | 4.0 |
| Linear C18 | 66.4 |
| Lactones (branched + linear) | 1.8 |
| Oligomer | 10.5 |
| Others | 6.9 |

*analysed after hydrogenation at the laboratory scale.

Example 10: Characterisation and Performance of Zeolites

The unmodified and modified zeolites used in the Examples were analysed using the test methods described herein. The results are given below.

TABLE 3

| Zeolite | $V_{pore}$ (cm3/g) | $V_{micro}$ (cm3/g) | $V_{meso}$ (cm3/g) | $V_{micro}$ as % of $V_{pore}$ |
|---|---|---|---|---|
| Zeolite A | 0.208 | 0.163 | 0.045 | 78 |
| Zeolite B | 0.201 | 0.139 | 0.062 | 69 |
| Zeolite C | 0.320 | 0.166 | 0.154 | 52 |
| Zeolite Mod A | 0.731 | 0.119 | 0.612 | 16 |
| Zeolite Mod B | 0.724 | 0.169 | 0.555 | 23 |
| Zeolite Mod C | 1.246 | 0.108 | 1.138 | 9 |

In Table 3, total pore volume ($V_{pore}$) has been measured by nitrogen physisorption and is the sum of micropore volume ($V_{micro}$) and mesopore volume ($V_{meso}$) which are calculated by the empirical t-plot method. In the last column, the percentage of total pore volume which is micropore volume ($V_{micro}$ as % of $V_{pore}$) is shown to be significantly lower for the modified zeolites compared with the unmodified samples. This lower % ratio indicates the significant modification to pore structure which has occurred in each of the modified zeolites. For each of the modified zeolites, less than 50% of the total pore volume is present in micropores.

TABLE 4

| Zeolite | $S_{total}$ (m2/g) | $S_{external}$ (m2/g) | Total NH$_3$ uptake (μmol/g) | Strong NH$_3$ uptake (μmol/g) | Activity Factor: $S_{external}$ (m²/g) × Strong NH$_3$ uptake (μmol/g) |
|---|---|---|---|---|---|
| Zeolite A | 399 | 18 | 1012 | 847 | 15,246 |
| Zeolite B | 371 | 29 | 1141 | 862 | 24,998 |
| Zeolite C | 442 | 63 | 375 | 326 | 20,538 |
| Zeolite Mod A | 507 | 228 | 686 | 563 | 128,364 |
| Zeolite Mod B | 547 | 172 | 643 | 533 | 91,676 |
| Zeolite Mod C | 592 | 334 | 349 | 285 | 95,190 |

As can be seen from Table 4, the unmodified zeolites all have an activity factor, calculated as the product of $S_{external}$ and Strong NH$_3$ uptake of under 30,000. The modified zeolites all have an activity factor of over 30,000.

TABLE 5

| Zeolite | Time of isomerisation reaction at 260° C. with 1 wt % catalyst (hours) | Amount of branched fatty acid in product (wt %) | $V_{micro}$ as % of $V_{pore}$ | Activity Factor |
|---|---|---|---|---|
| Zeolite A | 5.5 | 1.9 | 78 | 15,246 |
| Zeolite B | 4 | 6.7 | 69 | 24,998 |
| Zeolite C | 6.25 | 10.4 | 52 | 20,538 |
| Zeolite Mod A | 5.5 | 46.2 | 16 | 128,364 |
| Zeolite Mod B | 6 | 50.7 | 23 | 91,676 |
| Zeolite Mod C | 6.25 | 47.1 | 9 | 95,190 |

It can be seen from Table 5 that the reduction in $V_{micro}$ as % of $V_{pore}$ and increase in activity factor of the modified zeolites is correlated with an increase in production of branched fatty acids.

The isomerisation reaction times for the modified zeolites were varied to achieve a similar final concentration of branched fatty acids in the product (between 46 to 51 wt %). The reaction times for the modified catalysts are 5.5 h (mod. A), 6.0 h (mod. B) and 6.25 h (mod. C) and reaction times of the unmodified catalysts have been selected to match the modified ones, with the exception of the Zeolite B. For Zeolite B the time is 4.0 h instead of 6.0 h, but the activity of this unmodified catalyst is anyway clearly lower and would not have reached the conversion range even with much longer reaction times.

It is to be understood that the invention is not to be limited to the details of the above embodiments, which are described by way of example only. Many variations are possible.

What is claimed:

1. A method of producing branched fatty acids, comprising:
    contacting a starting material comprising unsaturated fatty acids with an isomerization catalyst comprising an activity factor of from 30,000 to 200,000, wherein the activity factor is calculated as shown in formula (I):

activity factor=$S_{external}$×strong $NH_3$ uptake (I)

wherein:
        "$S_{external}$" is the external surface area in $m^2/g$ of the catalyst, measured by nitrogen physisorption; and
        "strong $NH_3$ uptake" is the amount of $NH_3$ in µmol/g which desorbs from the catalyst at a temperature between 327° ° C. and 550° C. during ammonia temperature programmed desorption; and
    isomerizing, with the catalyst, an amount of the unsaturated fatty acids to form a composition comprising branched fatty acids;
    wherein the catalyst is a zeolite comprising micropores and mesopores and wherein the micropore volume ($V_{micro}$) is from 1% to 50% of the total pore volume ($V_{pore}$) of micropores and mesopores, and wherein the catalyst has a surface area ($S_{total}$) of 450 $m^2/g$ to 650 $m^2/g$ as measured via BET.

2. The method of claim 1, wherein the catalyst is used at a concentration of 0.1 to 2.8 wt %, based on the total weight of fatty acids in the starting material.

3. The method of claim 1, wherein the micropore volume ($V_{micro}$) is from 8% to 25% of the total pore volume ($V_{pore}$) of micropores and mesopores.

4. The method of claim 1, wherein the contacting of the starting material with the isomerization catalyst comprises contacting a feedstock comprising unsaturated fatty acids with the isomerization catalyst.

5. The method of claim 1, wherein said catalyst is a zeolite of the MFI type framework.

6. The method of claim 1, wherein said catalyst is a zeolite and comprises channels with 10 member ring structures.

7. The method of claim 1, wherein said catalyst is a ZSM-5 zeolite.

8. The method of claim 1, wherein the catalyst-external surface area $S_{external}$ of the catalyst is at least 80 $m^2/g$.

9. The method of claim 1, wherein the catalyst has-strong $NH_3$ uptake of the catalyst is at least 100 µmol/g.

10. The method of claim 1, wherein the catalyst has a silica to alumina molar ratio (SAR) of at least 15.

11. The method of claim 1, wherein the zeolite is obtainable by a method of modifying the structure of a zeolite comprising:
    contacting the zeolite with an alkaline solution;
    contacting the zeolite with an acidic solution; and
    contacting the zeolite with an ion exchange material.

12. The method of claim 11, wherein the ion exchange material is an ion exchange solution comprising $NH_4NO_3$.

13. The method of claim 11, wherein the alkaline solution and/or the acidic solution and/or the ion exchange solution is at a concentration of under 1 M.

14. The method of claim 11, wherein the method of modifying the structure of the zeolite further comprises:
    calcining the zeolite at a temperature of at least 400° C. for at least 2 hours.

15. The method of claim 1, wherein the catalyst has a silica to alumina molar ratio of 15:1 to 100:1.

16. The method of claim 1, wherein the catalyst has a surface area ($S_{total}$) of 500 $m^2/g$ to 600 $m^2/g$.

17. The method of claim 1, wherein the external surface area ($S_{external}$) of the catalyst is 160 $m^2/g$ to 400 $m^2/g$.

18. The method of claim 1, wherein the catalyst has a strong $NH_3$ uptake of 250 µmol/g to 600 µmol/g.

19. The method of claim 1, wherein the activity factor is 80,000 to 140,000.

* * * * *

UNITED STATES PATENT AND TRADEMARK OFFICE
CERTIFICATE OF CORRECTION

PATENT NO. : 12,151,232 B2
APPLICATION NO. : 17/250841
DATED : November 26, 2024
INVENTOR(S) : Bastiaan Wels et al.

Page 1 of 1

It is certified that error appears in the above-identified patent and that said Letters Patent is hereby corrected as shown below:

On the Title Page

Column 2, Line 13 (Foreign Patent Documents) delete "201501004" and insert -- 2015001004 --, therefor.
Column 2, Line 12 (Other Publications) delete "p." and insert -- pp. --, therefor.

In the Specification

In Column 15, Line 29 delete "(473 K))" and insert -- (473 K) --, therefor.
In Column 16, Line 42 delete "016:0," and insert -- C16:0, --, therefor.
In Column 16, Line 42 delete "018:0," and insert -- C18:0, --, therefor.

In the Claims

In Column 21, Claim 1, Line 34 delete "327° °C." and insert -- 327° C. --, therefor.
In Column 22, Claim 8, Line 14 delete "catalyst-".
In Column 22, Claim 9, Line 16 delete "catalyst has-".

Signed and Sealed this
Eleventh Day of February, 2025

Coke Morgan Stewart
*Acting Director of the United States Patent and Trademark Office*